Patented June 24, 1930

1,765,692

UNITED STATES PATENT OFFICE

MARTIN MÜLLER-CUNRADI, OF LUDWIGSHAFEN-ON-THE-RHINE, AND WILHELM WILKE, OF MANNHEIM, GERMANY, ASSIGNORS TO I. G. FARBENINDUSTRIE AKTIENGESELLSCHAFT, OF FRANKFORT-ON-THE-MAIN, GERMANY

MOTOR FUEL

No Drawing. Application filed October 21, 1924, Serial No. 745,027, and in Germany January 14, 1924.

This invention relates to an improved fuel for operating internal combustion engines and has as its purpose to increase the efficiency of the operation. We have found that an important improvement is produced by employing a liquid fuel which contains an addition of a soluble iron compound other than iron carbonyl. Iron carbonyl is very suitable but other soluble compounds, for example iron acetyl acetonate may also be used. With such fuels the most undesirable "knocking" is avoided even at high pressures and the process of combustion is favourably influenced so as to result in a higher efficiency. Liquid fuels of most various kinds for example gasoline, or higher or lower fractions of naphtha, or benzene, or alcohols, or mixtures of gasoline with benzene or alcohols or other liquid fuels may be employed in combination with said iron compounds. The quantity of soluble iron compound best suited varies according to the particular liquid fuel and the special conditions under which it is used. Amounts of between one tenth of one percent and a few per cents, by volume, may be employed, or even lower or higher percentages.

As an example, an automobile fitted with a six-cylinder motor having a compression ratio of 1 to 5,8 and operated with ordinary gasoline (containing petrol hydrocarbons of low and higher boiling point) of 0,72 specific gravity showed heavy "knocking" especially when running with full load and reduced rotation of the motor, for example uphill. Such "knocking" was completely eliminated when gasoline was used containing about ten grams of iron acetyl acetonate for each gallon.

What we claim is:

1. As a composition of matter, gasoline containing between about a tenth and one percent of iron acetyl acetonate.

2. A motor fuel comprising a combustible liquid in combination with iron acetyl acetonate.

3. A motor fuel comprising a combustible liquid in combination with between about $\frac{1}{10}$ and 1 per cent of iron acetyl acetonate.

In testimony whereof we have hereunto set our hands.

MARTIN MÜLLER-CUNRADI.
WILHELM WILKE.